United States Patent [19]

Tomoike

[11] Patent Number: 5,790,955
[45] Date of Patent: Aug. 4, 1998

[54] MOBILE COMMUNICATION SYSTEM WHICH PERFORMS COMMUNICATION RESTRICTION CONTROL

[75] Inventor: Hiroyuki Tomoike, Tokyo, Japan

[73] Assignee: NEC Corporation, Tokyo, Japan

[21] Appl. No.: 663,716

[22] Filed: Jun. 14, 1996

[30]  Foreign Application Priority Data

Jun. 26, 1995  [JP]  Japan ................................. 7-159048

[51]  Int. Cl.$^6$ ................................................... H04Q 7/38
[52]  U.S. Cl. ........................... 455/453; 455/405; 455/432; 455/436
[58]  Field of Search ................................. 455/67.1, 405, 455/418, 432, 434, 445, 453, 512, 515, 524, 525, 436

[56]  References Cited

U.S. PATENT DOCUMENTS

| 4,670,899 | 6/1987 | Brody et al. | 455/453 |
|---|---|---|---|
| 4,974,256 | 11/1990 | Cyr et al. | 455/453 |
| 5,097,499 | 3/1992 | Cosentino | 455/432 |
| 5,274,368 | 12/1993 | Breeden et al. | 455/410 |
| 5,371,780 | 12/1994 | Amitay . | |

*Primary Examiner*—Edward F. Urban
*Assistant Examiner*—Thuan Nguyen
*Attorney, Agent, or Firm*—Young & Thompson

[57]  ABSTRACT

In a mobile communication system, a mobile communication switching center includes a communication restriction control section for calculating a communication channel usage from the traffic volume of communication channels, comparing the usage with first and second thresholds, and designating communication restriction on the basis of the comparison result, and a base station control section for creating first notification information indicating communication restriction on only the roaming mobile station or second notification information indicating communication restriction on all the mobile stations on the basis of an instruction from the communication restriction control section depending on whether it is determined that the calculated communication channel usage is higher than the first threshold but is not higher than the second threshold, or exceeds the second threshold, and transmitting control information including the pieces of first and second notification information to each of the mobile stations through the mobile communication switching center. Each of the mobile stations includes determination section for determining on the basis of the control information transmitted from the radio base station whether communication restriction is imposed on the mobile station.

9 Claims, 2 Drawing Sheets

MOBILE COMMUNICATION SYSTEM WHICH PERFORMS COMMUNICATION RESTRICTION CONTROL

BACKGROUND OF THE INVENTION

The present invention relates to a mobile communication system which performs inter-operator roaming to allow a mobile station which subscribes for telephone communication to a given mobile communication operator to receive a mobile communication service from another mobile communication operator.

In general, a mobile communication system is constituted by a plurality of mobile stations, a plurality of radio base stations for providing radio channels for the mobile stations in an area, and a base station control section for performing channel control for the radio base stations. In performing communication, a given mobile station in this system transmits/receives a control signal to/from a corresponding radio base station by using a common control channel, and selects a communication channel in accordance with the transmitted/received control signal. In this case, the area in which a mobile station A1 which subscribes for telephone communication to a mobile communication operator A can perform communication is a service area A2 which is covered by each radio base station of the mobile communication operator A.

This mobile communication system provides the following mobile communication service. When the mobile station A1 moves from the service area A2 to a service area B of a mobile communication operator B, the mobile station A1 can perform communication by using facilities (a radio base station and the like) of the mobile communication operator B. Such a mobile communication service is called "roaming". With this service, the mobile communication operator A can extend the service area without facility investment. For the mobile communication operator B, since idle communication channels are used, the profit based on telephone charges can be increased.

In the mobile communication system, as the traffic increases, a phenomenon called a channel block occurs in which communication channel assignment cannot be performed although the control channel is idle. With this channel block, the efficiency of channel utilization deteriorates. For this reason, the traffic in each zone as the area of each radio base station is monitored. When the traffic rapidly increases, originating restriction is performed to prevent the channel block.

In the conventional mobile communication system, the following schemes are known as communication restriction schemes for preventing the above channel block: a scheme in which when a communication channel for an originating operation is to be assigned to a given mobile station, the restriction level of the communication channel is changed in accordance with the frequency of assignment failure of the communication channel in a busy state, and a scheme in which a communication channel usage and threshold in a radio zone are notified to a mobile station at predetermined intervals, and hand-over to an adjacent zone is performed when the usage exceeds the threshold.

In the mobile communication system which allows inter-operator roaming, when most of the communication channels are occupied by roaming subscribers (i.e., subscribers who perform communication through the facilities of another mobile communication operator), original subscribers cannot perform communication because of the above communication restriction.

SUMMARY OF THE INVENTION

It is an object of the present invention to provide a mobile communication system which prevents roaming subscribers from occupying communication channels to ensure mobile communication services for original subscribers.

In order to achieve the above object, according to the present invention, there is provided a mobile communication system comprising a plurality of mobile stations including a roaming mobile station which subscribes for telephone communication to another mobile communication operator, a radio base station connected to the mobile stations through a radio channel constituted by a control channel and a plurality of communication channels, and a mobile communication switching center connected to the radio base station to perform restriction control for terminating/originating operations of the mobile stations in accordance with a traffic volume of communication channels, the mobile communication switching center permitting an originating/terminating operation of the roaming mobile station, the mobile communication switching center including communication restriction control means for calculating a communication channel usage from the traffic volume of the communication channels, comparing the usage with a first threshold and a second threshold higher than the first threshold, and designating communication restriction on the basis of the comparison result, and base station control means for creating first notification information indicating communication restriction on only the roaming mobile station on the basis of an instruction from the communication restriction control means when it is determined that the calculated communication channel usage is higher than the first threshold but is not higher than the second threshold, creating second notification information indicating communication restriction on all the mobile stations on the basis of the instruction when it is determined that the calculated communication channel usage exceeds the second threshold, and transmitting control information including the pieces of first and second notification information to each of the mobile stations through the mobile communication switching center, and each of the mobile stations including determination means for determining on the basis of the control information transmitted from the radio base station whether communication restriction is imposed on the mobile station.

DESCRIPTION OF THE PERFERRED EMBODIMENT

The present invention will be described below with reference to the accompanying drawings.

Figure 1:
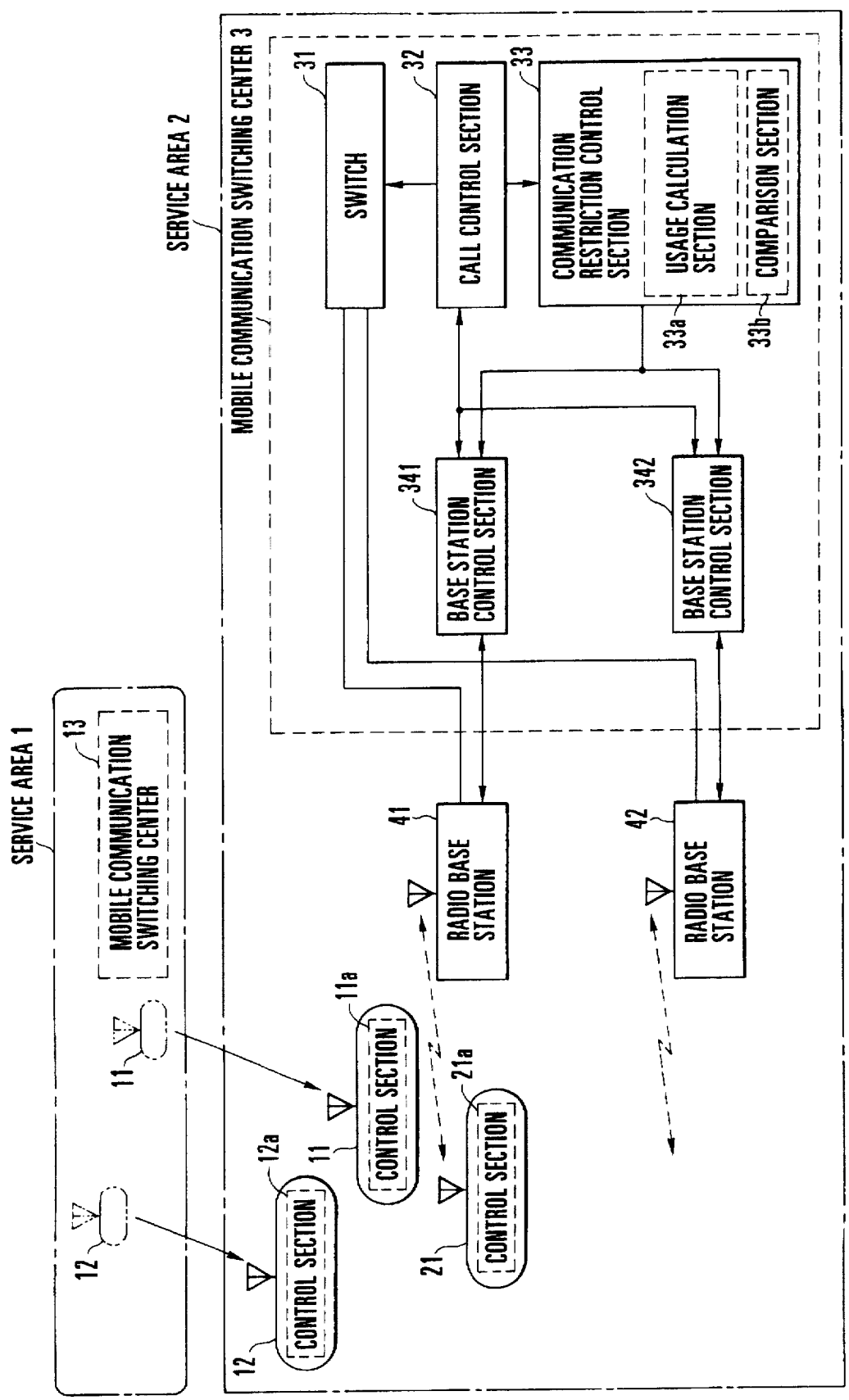
FIG. 1 is a block diagram showing a mobile communication system according to an embodiment of the present invention.

FIG. 1 shows a mobile communication system according to an embodiment of the present invention. Referring to FIG. 1, reference numeral 1 denotes a service area as the range in which a mobile communication operator A can provide services; 2, a service area as the range in which a mobile communication operator B can provide services; 11 and 12, mobile stations which subscribe for telephone communication to the mobile communication operator A; 13, a mobile communication switching center installed in the service area 1 to provide a communication channel for each mobile station and perform switching connection and the like; and 21, a mobile station which subscribes for telephone communication to the mobile communication operator B. The mobile stations 11, 12, and 21 respectively include control sections 11a, 12a, and 21a as determination means for determining the presence/absence and type of communication restriction on the basis of notification information notified from a mobile communication switching center 3.

The mobile communication switching center 3 is installed in the service area 2 to provide a communication channel for each mobile station and perform switching connection and the like. Reference numerals 41 and 42 denote radio base stations connected to mobile stations through radio channels so as to relay communication between the radio-connected mobile stations and the mobile communication switching center 3. The mobile communication switching center 3 includes a switch 31 for switching communication channels, a call control section 32 for performing call control including switching connection, a communication restriction control section 33 for controlling communication restriction with respect to mobile stations, and base station control sections 341 and 342 for controlling the radio base stations 41 and 42. The communication restriction control section 33 includes a usage calculation section 33a for calculating a communication channel usage in each of the zones of the radio base stations 41 and 42, and a comparison section 33b for comparing the usage calculated by the usage calculation section 33a with two predetermined thresholds (to be described later).

When an originating request is sent from a mobile station through the radio base stations 41 and 42 and the base station control sections 341 and 342, the call control section 32 of the mobile communication switching center 3 performs call control such as an instruction for communication channel assignment with respect to the base station control sections 341 and 342. In addition, the call control section 32 measures the traffic volume of communication channels at the switch 31, and notifies the communication restriction control section 33 of the traffic volume. The communication restriction control section 33 calculates communication channel usages in the respective zones of as the areas of the radio base stations 41 and 42 on the basis of a traffic volume notified from the call control section 32, and designates communication restriction with respect to the base station control sections 341 and 342 in accordance with the calculated usages.

Figure 2:
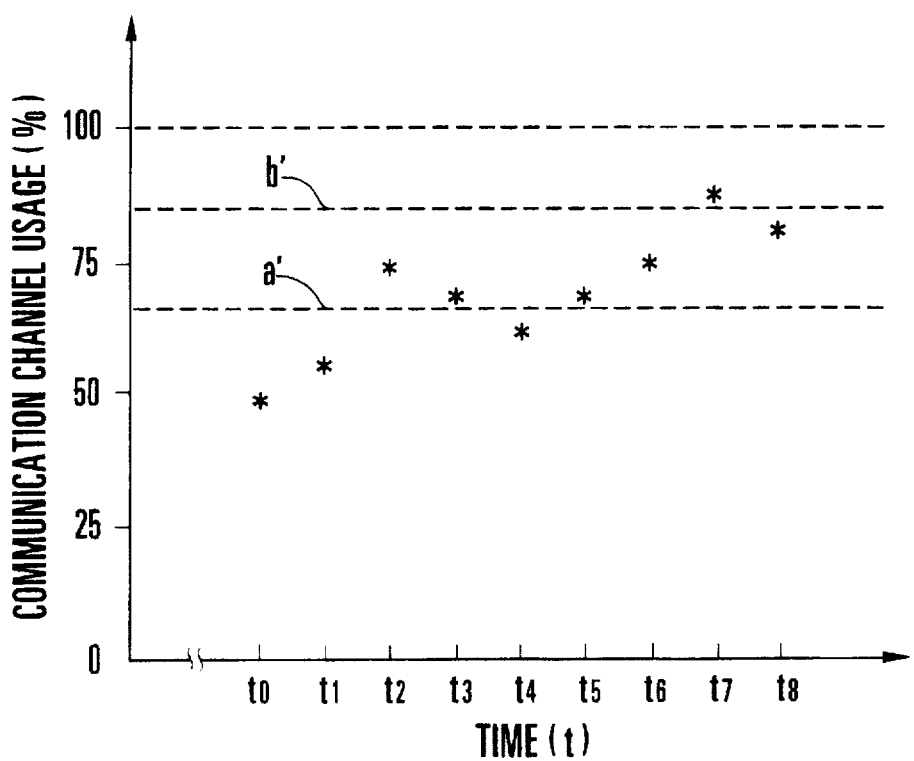
FIG. 2 is a chart showing a communication channel usage threshold for restricting only roaming subscribers and a communication channel usage threshold for restricting all subscribers in the system shown in FIG. 1.

As shown in FIG. 2, communication channel usage thresholds a' and b' obtained from usage data are set in the communication restriction control section 33. The usage calculation section 33a of the communication restriction control section 33 calculates a communication channel usage in each zone on the basis of a traffic volume notified from the call control section 32. The comparison section 33b compares the calculated communication channel usage with the thresholds a' and b'. If the communication channel usage exceeds the threshold a', the communication restriction control section 33 designates a communication restriction X on roaming subscribers, i.e., the mobile stations 11 and 12 which subscribe for telephone communication to the mobile communication operator A, with respect to the base station control sections 341 and 342. If the calculated communication channel usage exceeds the threshold b' which is higher than the threshold a', the communication restriction control section 33 designates, with respect the base station control sections 341 and 342, a communication restriction Y on not only the roaming subscribers, i.e., the mobile stations 11 and 12, but also all the subscribers in the self-network, i.e., all the mobile stations including the mobile station 21 which subscribes for telephone communication to the mobile communication operator B.

The base station control sections 341 and 342 perform communication channel assignment in accordance with an instruction output from the call control section 32 in response to the originating request from the mobile station. In addition, the base station control sections 341 and 342 create various types of notification information in accordance with an instruction from the communication restriction control section 33. More specifically, upon reception of an instruction for the communication restriction X from the communication restriction control section 33, the base station control sections 341 and 342 create notification information a, (corresponding to the threshold a') including restriction information for restrictions on position registration in the self-network and on an originating operation through the self-network with respect to the roaming subscribers 11 and 12. In contrast to this, upon reception of an instruction for the communication restriction Y from the communication restriction control section 33, the base station control sections 341 and 342 create notification information b (corresponding to the threshold b') including restrictions on position registration in the self-network and an originating operation through the self-network with respect to all the mobile stations including the mobile station 21 in the self-network. These pieces of notification information are notified to the radio base stations 41 and 42. Note that when communication restriction is not designated by the communication restriction control section 33, the base station control sections 341 and 342 create notification information c indicating that no communication restriction is performed, and notify this information to the radio base stations 41 and 42.

The radio base stations 41 and 42 always transmit one of the pieces of notification information ab, and c notified from the base station control sections 341 and 342 to each mobile station in each zone through a radio channel. Each of the pieces of notification information ab, and c includes the network number and position number of each network (service area) in which mobile stations are present, the structure information and restriction information of a control channel in each zone, and the like. Upon reception of pieces of notification information from the radio base stations 41 and 42, mobile stations perform position registration if it is required for a terminating operation or the like. If communication restriction is imposed in a zone, a mobile station does not perform position registration and an originating operation in the zone.

Assume that the mobile station 11 has moved from the service area 1 to the service area 2, as shown in FIG. 1. Upon reception of the notification information c from the radio base station 41, the control section 11a of the mobile station 11 recognizes from the network number included in the notification information c that the mobile station is a roaming subscriber. In addition, since the received position number is different from the position number stored in the mobile station 11 in advance, the control section 11a of the mobile station 11 recognizes that the mobile station 11 has moved to another zone. When the control section 11a of the mobile station 11 refers to the notification information c and recognizes that no communication restriction is imposed, the control section 11a supplies a position registration request to the mobile communication switching center 3 through the radio base station 41. When the mobile communication switching center 3 recognizes that the mobile station 11 which has generated the position registration request is a roaming subscriber, the mobile communication switching center 3 performs internetwork authentication processing to recognize, between the mobile communication switching center 3 and the mobile communication switching center 13 in the mobile communication switching center 13 installed in the service area 1, that the mobile station 11 subscribes for telephone communication to the mobile communication operator A which provides the service area 1. If authentication is determined as "OK", the mobile station 11 in the service area 2 is allowed to perform an originating operation or the like through the mobile communication switching center 3.

In starting communication, the mobile station 11 transmits an originating request to the mobile communication switching center 3 upon referring to the restriction information included in the notification information. Upon reception of the originating request from the mobile station 11 through the radio base station 41, the call control section 32 of the mobile communication switching center 3 designates channel assignment with respect to the base station control section 341. The base station control section 341 selects an idle communication channel and assigns it to the mobile station 11, which has generated the originating request, in accordance with the instruction from the call control section 32. The mobile station 11 shifts to a communication state by using the idle communication channel notified from the base station control section 341 through the radio base station 41.

If it is determined on the basis of the used state of each communication channel notified from the call control section 32 that the communication channel usage in the zone covered by the radio base station 41 exceeds the threshold a', the communication restriction control section 33 designates communication restriction on the radio base station 41 with respect to the base station control section 341. In accordance with the instruction from the communication restriction control section 33, the base station control section 341 creates the notification information a and sends it to the radio base station 41. The radio base station 41 transmits this notification information a to the self-zone.

As shown in FIG. 1, when the mobile station 12 moves into the zone of the radio base station 41, the mobile station 12 receives the notification information a which has been transmitted to the zone of the radio base station 41. The control section 12a of the mobile station 12 recognizes from the received notification information a that the mobile station has moved to another area. Furthermore, the control section 12a recognizes that the mobile station is a roaming subscriber, and position registration and originating operation restrictions are imposed on the roaming subscriber in the current zone, and hence does not output any position registration request to the mobile communication switching center 3 through the radio base station 41.

In contrast to this, upon reception of the notification information a transmitted from the radio base station 41, the control section 21a of the mobile station 21, which has moved to the zone of the radio base station 41, recognizes that the mobile station has moved to another area. Thereafter, the control section 21a determines that position registration and generation of an originating request can be performed, because the mobile station is not a roaming subscriber. In this case, the control section 21a of the mobile station 21 outputs a position registration request to the mobile communication switching center 3 through the radio base station 41 to perform position registration in the service area 2. In addition, the mobile station 21 can perform an originating operation through the radio base station 41.

Upon reception of the notification information b, the mobile stations 11, 12, and 21 recognize that communication restriction is imposed on all the mobile stations, and hence perform neither position registration nor generation of originating requests. The control sections 11a and 12a of the mobile stations 11 and 12 determine the presence/absence of communication restrictions on the basis of the pieces of notification information a and b (the presence of restrictions) and the notification information c (the absence of restrictions). In contrast to this, the control section 21a of the mobile station 21 determines the presence/absence of a communication restriction on the basis of the notification information b (the presence of a restriction) and the pieces of notification information a and c (the absence of a restriction).

As described above, the different thresholds a' and b' are set for subscribers in the self-network and roaming subscribers as the numbers of available communication channels with respect to the total numbers of communication channels in the respective zones of the radio base stations 41 and 42. Even if, therefore, roaming subscribers occupy communication channels up to the threshold a', the communication channels between the thresholds a' and b' are always ensured as communication channels which can be used by subscribers in the self-network. For this reason, even if communication channels are occupied by roaming subscribers, subscribers in the self-network can perform communication. In addition, since common communication channels can be provided for subscribers in the self-network and roaming subscribers up to the threshold a' without assigning any special communication channels to roaming subscribers, the efficiency of communication channel utilization can be improved.

As has been described above, according to the present invention, in the mobile communication system which allows inter-operator roaming, since communication restriction is hierarchically imposed on mobile stations, communication channels can be prevented from being occupied by roaming subscribers, and mobile communication services for original subscribers can be ensured. In addition, the efficiency of communication channel utilization can be improved.

In addition, if the usage calculated from the traffic volume of communication channels is lower than a predetermined threshold, the corresponding notification information is notified to the mobile stations in the service area. A roaming mobile station can therefore perform communication by using a communication channel in another network.

What is claimed is:

1. A mobile communication system comprising:
   a plurality of mobile stations including a roaming mobile station which subscribes for telephone communication to another mobile communication operator;
   a radio base station connected to said mobile stations through a radio channel constituted by a control channel and a plurality of communication channels; and
   a mobile communication switching center connected to said radio base station to perform restriction control for terminating/originating operations of said mobile stations in accordance with a traffic volume of communication channels, said mobile communication switching center permitting an originating/terminating operation of said roaming mobile station,
   said mobile communication switching center including communication restriction control means for calculating a communication channel usage from the traffic volume of the communication channels, comparing the usage with a first threshold and a second threshold higher than the first threshold, and designating communication restriction on the basis of the comparison result, and base station control means for creating first notification information indicating communication restriction on only said roaming mobile station on the basis of an instruction from said communication restriction control means when it is determined that the calculated communication channel usage is higher than the first threshold but is not higher than the second threshold, creating second notification information indicating communication restriction on all said mobile stations on the basis of the instruction when it is determined that the calculated communication channel usage exceeds the second threshold, and transmitting control information including the pieces of first and second notification information to each of said mobile stations through said mobile communication switching center, and each of said mobile stations including determination means for determining on the basis of the control information transmitted from said radio base station whether communication restriction is imposed on the mobile station.

2. A system according to claim 1, wherein said base station control means transmits third notification information as control information to said mobile station through said radio base station, when the communication channel usage calculated from the traffic volume of the communication channels is lower than the first threshold.

3. A system according to claim 2, wherein said determination means of each of said mobile stations except for said roaming mobile station determines that communication restriction is imposed on said mobile station, only when the second notification information is received.

4. A system according to claim 2, wherein said determination means of said roaming mobile station determines that communication restriction is imposed on said mobile station, when the pieces of second and third notification information are received.

5. A system according to claim 1, wherein said communication restriction control means comprises calculation means for calculating a communication channel usage from a traffic volume of communication channels, and comparison means for comparing the communication channel usage calculated by said calculation means with a first predetermined threshold and a second threshold higher than the first threshold.

6. A system according to claim 1, further comprising call control means for notifying said communication restriction control means of a measured traffic volume of communication channels, and designating communication channel assignment with respect to said base station control means when an originating request is generated by said mobile station.

7. A system according to claim 1, wherein said mobile station stops position registration and generation of an originating request with respect to said mobile communication switching center when said determination means determines that communication restriction is imposed on said mobile station.

8. A mobile communication system comprising:
a plurality of mobile stations including a roaming mobile station which subscribes for telephone communication to another mobile communication operator;
a radio base station connected to said mobile stations through a radio channel constituted by a control channel and a plurality of communication channels; and
a mobile communication switching center connected to said radio base station to perform restriction control for terminating/originating operations of said mobile stations in accordance with a traffic volume of communication channels, said mobile communication switching center permitting an originating/terminating operation of said roaming mobile station,
said mobile communication switching center including
communication restriction control means having calculation means for calculating a communication channel usage from a traffic volume of communication channels, and comparison means for comparing the communication channel usage calculated by said calculation means with a first predetermined threshold and a second threshold higher than the first threshold, said communication restriction control means designating communication restriction on the basis of the comparison result obtained by said comparison means,
base station control means for creating first notification information indicating communication restriction on only said roaming mobile station on the basis of an instruction from said communication restriction control means when it is determined that the calculated communication channel usage is higher than the first threshold but is not higher than the second threshold, creating second notification information indicating communication restriction on all said mobile stations on the basis of the instruction when it is determined that the calculated communication channel usage exceeds the second threshold, creating third notification information when the communication channel usage is lower than the first threshold, and transmitting control information including the pieces of first to third notification information to said mobile station through said radio base station, and
call control means for notifying said communication restriction control means of a measured traffic volume of communication channels, and designating communication channel assignment with respect to said base station control means when an originating request is generated by said mobile station, and
each of said mobile stations including determination means for determining on the basis of the control information transmitted from said radio base station whether communication restriction is imposed on the mobile station.

9. A system according to claim 8, wherein said determination means of each of said mobile stations except for said roaming mobile station determines that communication restriction is imposed on said mobile station, only when the second notification information is received, and said determination means of said roaming mobile station determines that communication restriction is imposed on said mobile station, when the pieces of second and third notification information are received.

* * * * *